(12) United States Patent
Kochbeck et al.

(10) Patent No.: US 12,377,606 B2
(45) Date of Patent: Aug. 5, 2025

(54) NOZZLE AND SYSTEM FOR THREE-DIMENSIONAL INK PRINTING

(71) Applicant: Gaeastar Corp., San Francisco, CA (US)

(72) Inventors: Felix Kochbeck, Berlin (DE); Daniel Pavel, Berlin (DE); Maria Colmenares, Berlin (DE); Kulana Cummings, Berlin (DE); Sanjeev Mankotia, Berlin (DE); Boris Agea Blanco, Berlin (DE)

(73) Assignee: Gaeastar Corp., San Francisco, CA (US)

( * ) Notice: Subject to any disclaimer, the term of this patent is extended or adjusted under 35 U.S.C. 154(b) by 0 days.

(21) Appl. No.: 18/247,870

(22) PCT Filed: Oct. 5, 2022

(86) PCT No.: PCT/EP2022/077676
§ 371 (c)(1),
(2) Date: Apr. 4, 2023

(87) PCT Pub. No.: WO2023/061820
PCT Pub. Date: Apr. 20, 2023

(65) Prior Publication Data
US 2024/0300173 A1     Sep. 12, 2024

(30) Foreign Application Priority Data
Oct. 12, 2021 (DE) ..................... 10 2021 126 403.0

(51) Int. Cl.
*B29C 64/209* (2017.01)
*B29C 64/129* (2017.01)
(Continued)

(52) U.S. Cl.
CPC .......... *B29C 64/209* (2017.08); *B29C 64/241* (2017.08); *B29C 64/245* (2017.08);
(Continued)

(58) Field of Classification Search
CPC ..... B29C 48/02; B29C 48/142; B29C 48/301; B29C 48/305; B29C 48/313;
(Continued)

(56) References Cited

U.S. PATENT DOCUMENTS

| 5,659,343 A | 8/1997 | Koizumi et al. |
| 6,017,207 A * | 1/2000 | Druschel ............... B29C 48/313 425/141 |

(Continued)

FOREIGN PATENT DOCUMENTS

| DE | 19518124 C1 * | 12/1996 | ............. B29C 31/04 |
| DE | 101 28 664 A1 | 6/2001 | |

(Continued)

OTHER PUBLICATIONS

English Translation DE 19518124, 1996 (Year: 1996).*

*Primary Examiner* — Xiao S Zhao
*Assistant Examiner* — Victoria Bartlett
(74) *Attorney, Agent, or Firm* — Levine Bagade Han LLP

(57) ABSTRACT

We describe a nozzle for a three-dimensional, 3D, ink printer, wherein the nozzle comprises: a channel configured to guide ink through the nozzle, and an output portion coupled to the channel, wherein the output portion is configured to output the ink, wherein the output portion comprises an elongated output channel configured to output the ink at different locations along a length of the elongated output channel simultaneously.

13 Claims, 11 Drawing Sheets

(51) Int. Cl.
*B29C 64/141* (2017.01)
*B29C 64/241* (2017.01)
*B29C 64/245* (2017.01)
*B33Y 10/00* (2015.01)
*B33Y 30/00* (2015.01)

(52) U.S. Cl.
CPC ............... *B33Y 10/00* (2014.12); *B33Y 30/00* (2014.12); *B29C 64/129* (2017.08); *B29C 64/141* (2017.08); *B29K 2995/0037* (2013.01)

(58) Field of Classification Search
CPC ..... B29C 64/106; B29C 64/129; B29C 64/14; B29C 64/209; B29C 64/241; B29C 64/245; B29C 41/04; B29K 2995/0037; B33Y 10/00; B33Y 30/00
See application file for complete search history.

(56) References Cited

U.S. PATENT DOCUMENTS

| | | | |
|---|---|---|---|
| 2018/0264731 A1 | 9/2018 | Kritchman et al. | |
| 2018/0370133 A1 | 12/2018 | Provencher | |
| 2021/0178659 A1* | 6/2021 | Fakiri | B29C 48/05 |
| 2022/0072779 A1* | 3/2022 | Mu | B29C 64/343 |

FOREIGN PATENT DOCUMENTS

| | | | | |
|---|---|---|---|---|
| DE | 102017126274 | | 6/2019 | |
| EP | 0 805 014 A1 | | 11/1997 | |
| WO | WO 2005/021269 A1 | | 3/2005 | |
| WO | WO 2020/156134 A1 | | 8/2020 | |
| WO | WO-2021145818 A1 * | | 7/2021 | ............. B29C 48/02 |
| WO | PCT/EP2022/077676 | | 10/2022 | |

* cited by examiner

NOZZLE AND SYSTEM FOR THREE-DIMENSIONAL INK PRINTING

CROSS-REFERENCE TO RELATED APPLICATIONS

This application is a U.S. national phase application of International Application No. PCT/EP2022/077676 filed on Oct. 5, 2022, which claims the benefit of priority to DE 10 2021 126 403.0, filed on Oct. 12, 2021, the contents of which are incorporated herein by reference in their entireties.

FIELD OF THE INVENTION

The present invention relates to a nozzle for a three-dimensional, 3D, ink printer, a system comprising the nozzle and a 3D ink printer comprising the nozzle or the system. The nozzle comprises a channel configure to guide ink through the nozzle and an output portion coupled to the channel, wherein the output portion is configured to output the ink.

BACKGROUND TO THE INVENTION

In India, there is an ancient culture of terracotta vessels that are used to drink tea, made by hand and sold at a margin that still allows it to be a profitable business despite the minimal price point for the end consumer. For example, the process includes people that are forming vessels out of terracotta dirt with the bare hands on the riverside, afterwards these vessels are sun-dried and semi-fired at temperatures that are below the phase change to a sintered ceramic, resulting in earthenware. These vessels are either sold directly or e.g. distributed by making use of the train systems. This decentralized manufacturing method results in a superior user experience (premium compared to polymer or paper based vessels) while being low cost and sustainable from cradle to grave.

While traditional ceramic manufacturing methods have limitations in e.g. wall thickness (ceramic containers cannot be manufactured automatically at scale with wall thicknesses below 4 mm), one reason is that they cannot maintain the shape during drying and thus round objects might turn out to be oval. Another reason is the handling of the dry objects pre-sintering. The objects are transferred to the sintering oven via pick and place robots or manually, leading to breakage of the very fragile, thin wall, pre-sintered earthware objects and thus to a high scrap rate.

Traditional ceramic production processes (i.e. pressing and jiggering) produce scrap/waste/excess material. Even though a certain amount of the excess material can be reused when it is mixed into the raw material, this leads to defects in the material and limits its performance and/or appearance, e.g. color spots may be visible on the surface. Another disadvantage is that the energy consumption of this process is far from being optimized. In addition, most of the processes require heavy and costly machinery, something that interferes with the ability to manufacture these objects at the point of use and just in time.

Additive solutions for earthware like materials include selective laser sintering (SLS) of powdered (technical) ceramics, binder jetting of powdered ceramics and fused filament fabrication (FFF) or fused deposition modeling (FDM) techniques that are combined with an extrusion system and a pinhole earthware nozzle. The disadvantages of these technologies include that the built time can take several hours or even days. These approaches, especially the powder technologies, can deliver a high amount of detail and an almost unlimited freedom of design. However, due to the time limitations and due to the expensive and bulky machinery requirements these are not always suitable. In addition, FFF processes generate layers that have a very small surface contact area in the Z-axis, resulting in low mechanical stability of the printed products, less than the original material would offer. Another disadvantage of the FFF process is that the layers are produced by extruding material from a round noodle-like shape. This limits the Z-axis build height per layer as it can only be increased while also increasing wall thickness at the same time.

There is therefore a need for improvements of 3D ink printing for certain use cases. In particular, there is a need to produce single use vessels/objects just in time, preferably at the point of use with minimal manufacturing costs.

SUMMARY OF THE INVENTION

The invention is set out in the independent claims. Preferred embodiments of the invention are set out in the dependent claims.

The described invention may make use of traditional manufacturing processes (like jiggering. doctor blading and pressing) and combine them with state of the art additive manufacturing methods to overcome the disadvantages of the available technologies. Examples outlined herein may allow for a tailor-made, decentralized, low cost, low-time production cycle and comparably cheap production process that is easy to implement and to scale while being flexible in allowing a wide range of ink materials (in regards to e.g. particle size, chemical composition and rheology).

According to a first aspect, we describe a nozzle for a three-dimensional, 3D, ink printer. The nozzle comprises a channel configured to guide ink through the nozzle, and an output portion coupled to the channel, wherein the output portion is configured to output the ink. The output portion comprises an elongated output channel configured to output the ink at different locations along a length of the elongated output channel simultaneously. In some examples, the nozzle and any parts coupled thereto may consist of rigid and/or flexible materials as well as any combinations of these. In some examples, the material may consist of polytetrafluoroethylene, PTFE and/or polymers and/or non-metallic materials and/or metallic materials.

The channel may be made of any suitable material such as, for example, plastic which allows for the ink to flow freely through the channel with a minimal likelihood of blockage.

The output portion preferably comprises a rigid material, such as plastic, but may comprise any suitable material which allows for the ink to be output in a substantially frictionless manner. The elongated output channel may be configured to output the ink at multiple discrete points along the length of the elongated output channel simultaneously or output the ink along the entire length of the elongated output channel simultaneously.

In some examples, the elongated output channel configured to output the ink at different locations along the length of the elongated output channel simultaneously is based on a said ink being guided through the output portion and/or the output channel. This may allow for the ink to be output in a free-flowing manner and for the ink to be output in a precise manner.

In some examples, the nozzle further comprises an input portion configured to receive the ink. The input portion may be of any suitable design, such as, for example, a pipe, which allows for the ink to be input into the nozzle in a relatively frictionless manner and in a manner which may reduce the likelihood of blockages within the input portion and/or the nozzle. The input portion may comprise plastic, polymers or any other suitable material.

In some examples, the channel configured to guide ink through the nozzle is configured to couple the input portion to the output portion for guiding the ink from the input portion to the output portion. This may allow for the ink to flow freely through the nozzle from the input portion to the output portion.

In some examples, the nozzle further comprises an anchoring portion configured to anchor the nozzle to a 3D ink printer. This may allow for the nozzle to be secured during the functioning of the nozzle, thereby leading, e.g., to a safer method of manufacturing. The anchoring portion may comprise a thread for a screw or bolt and/or a pin and/or a magnet for magnetic coupling and/or a hinge and/or any other element suitable for anchoring the nozzle to a 3D ink printer.

In some examples, the anchoring portion comprises at least a section of the elongated output channel. This may allow for a faster manufacturing of an object, thereby improving output capacities. This may also allow for an improved ink output accuracy as the ink can be output where it is needed during the manufacturing process.

In some examples, the nozzle is formed from two leg portions connected to each other, wherein the two leg portions form an angle therebetween of between approximately 90 degrees and approximately 120 degrees, wherein the length of the elongated output channel is comprised in at least a first leg portion of a first one of the legs and in at least a second leg portion of the second one of the legs, and wherein the first leg portion and the second leg portion are connected with each other for the elongated output channel to be continuous along said length. This may be particularly preferable for symmetric objects, such as cups, which may be printed by the ink output from the nozzle. The angle may be adjustable according to the object to be printed.

In some examples, the nozzle further comprises an overflow prevention portion configured to prevent the ink from overflowing from the nozzle. This may reduce wastage and therefore reduce manufacturing costs.

In some examples, the overflow prevention portion comprises an elongated element arranged substantially perpendicular to a longitudinal axis of the elongated output channel. This may reduce wastage and therefore reduce manufacturing costs.

In some examples, the nozzle further comprises a first lip and a second lip, wherein the elongated output channel is formed between the first and second lips. This may allow for an accurate ink output, thereby improving the accuracy of the object to be printed and/or the reduction of ink wastage, thereby leading to a reduction in manufacturing costs. The lips preferably comprise a rigid material such as, for example, plastic or polymer, but may comprise any suitable material which allows the ink to be output between the lips in a substantially frictionless manner and reduces the likelihood of blockage of the output channel.

In some examples, the first and second lips comprise elongated first and second lips, respectively, and wherein the elongated output channel is defined by the elongated first and second lips. This may allow for the ink to be output in a precise manner, thereby leading to a more accurate and improved printed product and/or a reduction in ink wastage.

In some examples, the first lip is configured to seal a gap between the nozzle and a mold which the nozzle is configured to output ink onto. This may allow for a reduction in ink wastage as the ink is spread across a surface of the mold as it is output by the elongated output channel.

In some examples, the second lip is configured to be moveable with respect to the first lip to control a characteristic of the output ink based upon a distance of the second lip from the first lip. The second lip may be movable via, for example, a hinge or any other element which allows for the second lip to be moved with respect to the first lip. The movement of the second lip may be actuated via a motor which may be part of the nozzle or external to the nozzle, or alternatively, the second lip may be moveable via the pressure of the ink being output by the elongated output channel. The controlled characteristic may be, for example, an output pressure of the ink, an output velocity of the ink, a dimensional thickness of the ink output onto the mold, a viscosity of the ink, any other suitable characteristic, or any combination thereof. The altering of any one of these characteristics may lead to an improved product and/or an increased object output rate and/or reduced ink wastage and/or a lower likelihood of blockage of the elongated output channel.

In some examples, a pressure exertable by the second lip onto the first lip, upon a contact between the first lip and the second lip while no ink is guided through the nozzle, is changeable based on the second lip being configured to be moveable with respect to the first lip, wherein the controllable characteristic comprises a thickness of an object printable via the nozzle from the ink, and wherein, during guiding a said ink through the nozzle, the thickness is controllable via the pressure. The exertable pressure may be altered via a variable biasing force which biases the second lip to contact the first lip. This exertable pressure may then be overcome by the force of the ink being output by the elongated output channel. This may lead to an improved product and/or an increased object output rate and/or reduced ink wastage and/or a lower likelihood of blockage of the elongated output channel.

In some examples, the first lip and/or the second lip comprises a helix portion configured to aid outputting ink from the elongated output channel. Additionally or alternatively, the nozzle may comprise a helix portion. The use of a helix in the first lip and/or the second lip and/or the nozzle may allow for an improved flow of ink in the Z-axis direction i.e. along the length of the elongated channel. This may also allow for the elongated output channel and/or the nozzle to act as a variation of an Auger screw.

In some examples, the input portion comprises a plurality of input channels for guiding different ink materials through the nozzle. This may allow for inks and/or materials with different characteristics to be input into the nozzle simultaneously. This may lead to improved customization of the output product.

In some examples, the output portion comprises a plurality of elongated output channels. This may allow for inks and/or materials with different characteristics to be output from the nozzle simultaneously. This may lead to improved customization of the output product.

In some examples, one of the plurality of elongated output channels is coupled to a corresponding, respective one of the plurality of input channels. This may allow for inks and/or materials with different characteristics to be output from the nozzle simultaneously. This may lead to improved customization of the output product.

According to a second aspect, we describe a system comprising the nozzle and a mold, wherein the nozzle is configured to output ink onto the mold.

In some examples, the anchoring portion of the nozzle is configured to be coupled to an anchoring point in the mold. The anchoring portion of the nozzle may be the same as the anchoring portion mentioned above. In some examples, the anchoring point in the mold has an element for accepting the anchoring portion of the nozzle. For example, if the anchoring portion of the nozzle has a magnet of a first polarity, the anchoring point of the mold will have a magnet of a second polarity, thereby allowing for a secure coupling of the nozzle to the mold.

In some examples, the anchoring portion of the nozzle is configured to output ink onto a bottom part of the mold to print a bottom part of an object formed from the ink. This may allow for a faster manufacturing of an object, thereby improving output capacities. This may also allow for an improved ink output accuracy as the ink can be output where it is needed during the manufacturing process.

In some examples, the first lip is configured to seal a gap between the nozzle and the mold, and wherein the second lip is arranged between the output channel and the mold. This may allow for a reduction in ink wastage as the ink is spread across a surface of the mold as it is output by the elongated output channel. It may also allow for the dimensions of the elongated output channel to be altered depending on the characteristics of the object to be printed.

In some examples, the overflow prevention portion of the nozzle is configured to contact a portion of the mold, and wherein the overflow prevention portion is configured to prevent the ink from overflowing from the mold. This may reduce ink and material wastage, therefore reducing manufacturing costs.

In some examples, the nozzle is configured to stop outputting ink when the gap between the nozzle and the mold has been filled by the output ink. The nozzle may sense this via a sensor in the nozzle which senses when the ink is no longer being output and/or when the pressure of the channel exceeds a predetermined threshold.

In some examples, the mold is configured to move about at least one axis of the mold, wherein the nozzle is configured to be substantially stationary, and wherein the movement of the mold is configured to allow an object to be printed via the nozzle in a shape of the mold. This may allow for a particularly quick method of manufacturing as the mold is moved instead of the nozzle. This may in turn improve the object output rate. The mold may be coupled to, and moved by, a motor, which may be a stepper motor.

In some examples, the nozzle further comprises a rotatable element configured to contact a face of the mold and to stabilize the nozzle with respect to the mold during printing of the ink. This may allow for the nozzle to be stabilized, thereby improving the accuracy of the output of the ink. This may result in an improved end product.

In some examples, the mold is a negative mold. This may result in a mold which is reusable, thereby reducing manufacturing costs and a mold which, when combined with the nozzle, allows for a faster manufacturing time, thereby improving the output rate of the system.

In some examples, the mold comprises a porous material configured to aid ink drying after printing of the ink. This may reduce the manufacturing time of the object, thereby improving the output rate of the system.

In some examples, the porous material of at least a first portion of the mold comprises a first porosity and wherein the porous material of at least a second portion of the mold comprises a second porosity, wherein the first porosity is different from the second porosity. This may reduce the manufacturing time of the object (according to certain parts of the object requiring, based on the use of the object, lower or higher porosities than other parts), thereby improving the output rate of the system.

In some examples, a said porosity of the mold between the first portion of the mold and the second portion of the mold changes gradually. This may reduce the manufacturing time of the object, thereby improving the output rate of the system.

In some examples, at least a section of the mold comprises a hydrophobic material configured to prevent adhesion of the ink to the mold. This may result in an improved end product as the ink is not output onto areas which do not need it, thereby reducing manufacturing defects. This may also result in a reduction in ink wastage and therefore, a reduction in manufacturing costs.

In some examples, the system further comprises a movement component coupled to the nozzle and configured to move the nozzle with respect to the mold. In some examples, the movement of the nozzle is relative to the mold and the movement component is configured to relatively move the nozzle with respect to the mold. The movement component may be, for example, a motor configured to raise the nozzle from the mold and/or a rail with an actuator which is configured to move the nozzle with respect to the mold. This (relative) movement may occur during printing and/or after printing. This may allow for a more customizable end product and/or a reduction in manufacturing costs as the likelihood of the nozzle impacting the mold is lower. This may also allow for the printing of several layers of ink onto the mold. This may in turn increase the rigidity and structural integrity of the printed object. The layers may all comprise the same ink or different layers may comprise differing ink compositions/materials.

In some examples, the system further comprises a first motor coupled to the mold, and wherein the first motor is configured to rotate the mold during printing of the ink. The first motor may be, for example, a stepper motor. When ink is being output by the nozzle, the mold may rotate, thereby allowing ink to be output across the surface of the mold. This may result in an increased output rate of the system as objects can be printed at an increased rate. This may also allow for an even coating of ink across the surface of the mold, thereby leading to an improved end product.

In some examples, the system further comprises a RAM extruder configured to input ink into the input portion of the nozzle. This may allow for a predetermined amount of ink to be input into the system, thereby reducing ink wastage and manufacturing costs.

In some examples, the system further comprises a second motor configured to move the mold away from the nozzle upon completion of a printing process for printing the ink. In some examples, the movement of the nozzle is relative to the mold and the second motor is configured to relatively move the nozzle with respect to the mold. The motor may be a stepper motor. The mold may be moved upon completion of printing to a secondary location for further processing and/or for use by a user.

In some examples, the system further comprises a heating unit configured to heat the mold before a printing process for printing the ink and/or during printing of the ink and/or after completion of the printing process for printing the ink. This may reduce the manufacturing time of the object, thereby improving the output rate of the system. In some examples, a vacuum is coupled to the mold which may, in turn, help reduce the drying process time and result in a denser and thus more stable end product.

In some examples, the mold comprises a protrusion on a surface facing away from the nozzle. This may increase the surface area of the mold and result in a reduced drying time. This may be achieved via a water injection unit which is configured to provide water to capillaries located on the outside of the mold. This in turn may allow for a reduction in the manufacturing time of the object, thereby improving the output rate of the system. In some examples, the protrusion faces towards the nozzle. In some examples, there is a plurality of protrusions which face towards and/or away from the nozzle.

In some examples, the system further comprises a light source configured to sinter a part of the printed ink. The light source may be a LASER light source and/or a UV light source. This may allow for the object to be cured after printing (and/or during the printing process), thereby allowing for an object with an increased resilience. Additionally or alternatively, any other method that allows for a transfer of energy to the printed object may be used such as, for example, microwave or induction technologies.

In some examples, the mold comprises a plurality of sections at least partially disconnectable from each other. This may allow for an easy removal of the object after printing, thereby improving the manufacturing process.

In some examples, the system further comprises a housing configured to house the nozzle and the mold, and further comprising a screen which is movable for an object printed from the ink to be removable from the housing. This may allow for certain environmental conditions to be maintained within the housing during the printing process, thereby allowing an optimal manufacturing process. This may be maintained by allowing the housing to maintain a humid atmosphere which may allow for the ink to be prevented from drying (or drying too much) during the printing process.

According to a third aspect, we describe a 3D ink printer comprising the nozzle as described above or the system as described above.

According to a fourth aspect, we describe a method for printing a three-dimensional, 3D, object, the method comprising: providing a mold and a nozzle, wherein the nozzle comprises an elongated output channel configured to output ink at different locations along a length of the elongated output channel simultaneously, and wherein a shape of the elongated output channel conforms to a shape of mold; rotating, via a first motor, the mold; and outputting, via an output portion of the nozzle, the ink onto a first part of the mold, wherein the output portion of the nozzle comprises at least a section of the elongated output channel. The nozzle provides the ink to the elongated output channel which, in turn, in some examples, provides the ink to the surface of the mold. The elongated output channel may allow for the ink to be output in a free-flowing manner and for the ink to be output in a precise manner. The ink is output at different locations simultaneously via the outputting of the ink from the elongated output channel. Even though, in some examples, there may only be one output point, i.e. the output portion of the nozzle, the ink is output from the channel at multiple points simultaneously. In some examples, there are multiple points at where the ink is output, i.e. not just at the output portion of the nozzle, but at additional locations on the first and/or second leg of the nozzle. The rotation of the mold allows for the ink to be deposited in an even manner on said mold. In some examples, the ink is output by the output portion of the nozzle only while the mold is rotating. In some examples, the ink is first output by the nozzle and then the mold is rotated. In some examples, the ink is output by the output portion of the nozzle before the mold is rotated and during rotation of the mold. In some examples, the mold is first rotated and then the ink is output by the output portion of the nozzle.

In some examples, when the ink is output onto the first part of the mold, the ink is output in a radial direction, from the output portion of the nozzle, towards a sidewall of the mold. This may allow for the 3D object to be built up from the base of said object, should the first part be the base of the mold. This may allow for an improved structural integrity of the finished object as the object has a solidly printed base allowing for the walls of the object to have greater structural integrity.

In some examples, a rate of output of ink from the nozzle is variable and wherein the rate corresponds to at least one of: a rheology of the ink; and a rotation speed of the mold. The rheology of the ink may allow for the base and/or sidewalls of the object to be ticker or thinner depending on the desired properties of the finished object. This same principle applies to the rotation speed of the mold, as a higher rotation speed leads to thinner base/sidewalls of the finished object. Additionally, the rheology and the rotation speed may contribute to an increased throughput of the process, as a thinner ink and a faster rotation speed may allow for more objects to be produced in a given timeframe. The rate of output of ink may correspond to the rheology of the ink and/or the rotation speed of the mold in a linear manner, a non-linear manner, an exponential manner, a proportional manner, an inversely proportional manner, or in any other suitable manner. For example, a more viscous ink may lead to a higher rate of output due to said viscosity.

In some examples, a rate of output of ink from the nozzle is variable and wherein the rate corresponds to a size of the elongated output channel defined by elongated first and second lips of the nozzle. A larger output channel may allow for more ink to be deposited onto the mold, thereby leading to a 3D printed object with a thicker base and/or sidewalls. This may be particularly advantageous in scenarios where the finished object needs to contain very hot or very cold liquids as this may help insulate the liquid from the surroundings of the object and help a user pick up the object when containing such liquids, as the temperature differential between the user's hand and the surface of the object will be reduced. Additionally or alternatively, a larger output channel may allow for a larger throughput, as more ink can be deposited at once, thereby leading to a faster printing of the 3D object and increasing the number of objects that can be produced in a given timeframe. On the other hand, a smaller output channel may allow for the ink to be output onto the mold in a more precise manner, allowing the 3D object to be more intricate and have a more complicated design. The size of the elongated output channel may be defined as a volume of the channel and/or a gap between the elongated first and second lips and/or a cross-section of the elongated output channel. The rate of output of ink may correspond to the size of the elongated output channel defined by elongated first and second lips of the nozzle in a linear manner, a non-linear manner, an exponential manner, a proportional manner, an inversely proportional manner, or in any other suitable manner. For example, if the gap between the elongated lips is wide, a higher rate of ink output may be needed so that there is sufficient ink output onto the mold.

In some examples, the method further comprises inputting, via a RAM extruder, the ink at an input portion of the nozzle. This may allow for a predetermined amount of ink to be input into the system, thereby reducing ink wastage and manufacturing costs.

In some examples, the method further comprises outputting ink onto a sidewall of the mold, wherein the ink is output onto the sidewall via boundary layer pressure, and wherein the boundary layer pressure is exerted by already extruded ink onto newly extruded ink (i.e. generally by ink extruded at a first point in time onto ink extruded at a second point in time which is later than the first point in time); and 3D printing the object via guiding the ink through the elongated output channel to output the ink onto the first part and the sidewall of the mold. This may allow for the 3D object to be printed and formed. In particular, boundary layer pressure may allow for the ink to be forced through the elongated output channel and deposited on the mold in an area where ink is yet to be deposited. This may reduce the likelihood of areas of the mold having ink redeposited on them, leading to a double-thickness area of the finished object where such an area is not wanted. The outputting of the ink on the sidewall of the mold, as well as the base, allows for the 3D object to be built up into the form that is desired by the user.

In some examples, at a first point in time, the ink is output, via an anchoring portion, onto the bottom part of the mold; at a second point in time, the ink is output, in a radial direction from the output portion towards a sidewall of the mold via boundary layer pressure, wherein the boundary layer pressure is exerted by already extruded ink onto newly extruded ink; and at a third point in time, the ink is output, via the elongated output channel, onto the sidewall of the mold via the boundary layer pressure, wherein the second point in time is after the first point in time, and wherein the third point in time is after the second point in time. This may allow for the object to be 3D printed in a manner that provides a strong, stable base for the sidewalls to be built on.

In some examples, the output portion of the nozzle comprises an anchoring portion, and the anchoring portion comprises at least a section of the elongated output channel. This may allow for a faster manufacturing of an object, thereby improving output capacities. This may also allow for an improved ink output accuracy, as the ink can be output where it is needed during the manufacturing process.

In some examples, the first part of the mold is a bottom part of the mold. This may allow for the 3D object to be printed from the bottom up, thereby allowing for the object to be printed in such a way that gives the object a stable base and a strong construction.

Even if some of the aspects described above have been described in reference to the nozzle, the system or the 3D ink printer, these aspects may also apply to a method for printing an object from the ink and vice versa.

BRIEF DESCRIPTION OF THE DRAWINGS

These and other aspects of the invention will now be further described, by way of example only, with reference to the accompanying figures, wherein like reference numerals refer to like parts, and in which.

DETAILED DESCRIPTION OF THE PREFERRED EMBODIMENTS

Figure 1:
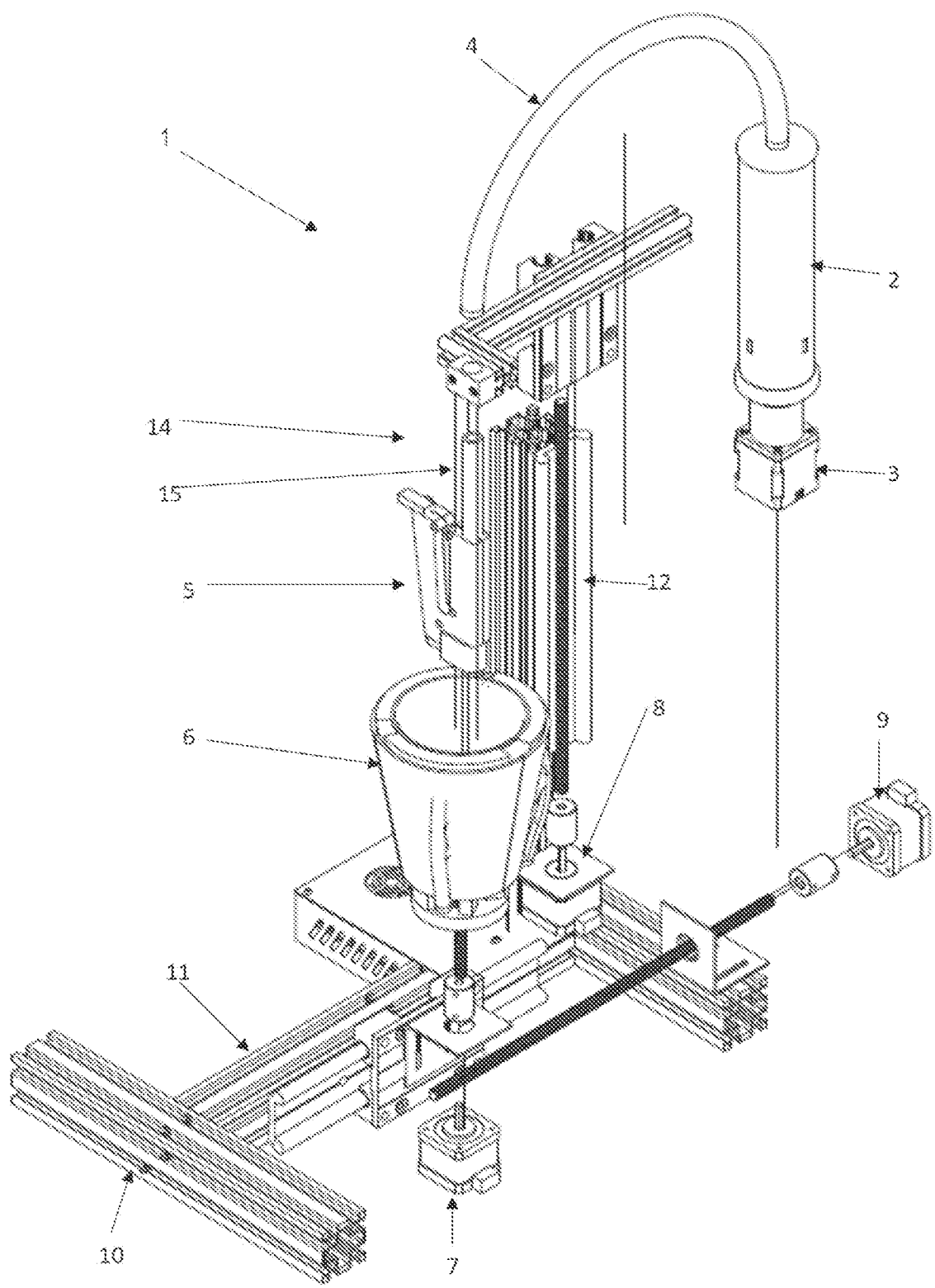
FIG. 1 shows a perspective view of a schematic illustration of a system for 3D ink printing according to some examples as described herein.

FIG. 1 shows a perspective view of a schematic illustration of a system for 3D ink printing according to some examples as described herein.

FIG. 1 shows a three-dimensional, 3D, ink printing device 1 suitable for 3D printing objects. The device 1 comprises an ink cartridge 2 configured to store ink suitable for 3D printing. The ink may comprise any suitable compounds that allow for a free-flowing ink that has a low likelihood of clumping and therefore blocking the device 1.

The ink cartridge 2 is coupled, in this example, to a RAM extruder 3 at one end of the ink cartridge 2. The RAM extruder 3 is configured to input a predetermined volume of ink into the device 1. The RAM extruder 3 may comprise a memory and a processor to undertake this task. In this example, a RAM extruder 3 is used but any suitable method of inputting ink from an ink cartage 2 into the device 1 may be used. In this example, the RAM extruder 3 pushes the ink out of the ink cartridge 2. The RAM extruder can be controlled to precisely feed ink and also to retract ink if needed, such as at the completion of a printing process.

At the second end of the ink cartridge 2, opposite to the end where the RAM extruder 3 is coupled to the ink cartridge 2, the ink cartridge 2 is coupled to a pipe 4. The pipe 4 comprises preferably plastic, but any material suitable for allowing the ink from the ink cartridge 2 to flow with minimal hindrance through the pipe 4 may be provided. In this example, the pipe 4 is substantially circular in its cross-section but the pipe 4 may have any suitable cross-section. In some examples, there may be several different ink cartridges 2 and pipes 4 used at the same time, allowing for multi material or gradient material printing. In some examples, the ink is in the form of a powder and is mixed with other additives such as water from a secondary pipe. Additionally or alternatively, other ink components such as, for example, an ink carrier, a secondary ink, the ink in a fluid form or any other suitable fluid may flow from the secondary pipe. Additionally or alternatively, a solid that acts similar to a fluid, such as a fine powder, may flow from the secondary pipe.

At the other end of the pipe 4 from the coupling to the ink cartridge 2, the pipe 4 is coupled to a nozzle 5. The nozzle 5 will be explained in more detail below. Placed underneath the nozzle is a mold 6. In this example, the mold 5 is a negative mold but it may be a positive mold. The mold 6 will be described in more detail below.

Coupled to the mold 6 is a Y-axis stepper motor 7 configured to rotate the mold 6. The Y-axis stepper motor 7 may comprise a processor and a memory in order to undertake its tasks.

The device 1 further comprises a Z-axis stepper motor 8 and an X-axis stepper motor 9. The Z-axis stepper motor is coupled to the nozzle 5 and the X-axis stepper motor 9 is coupled to the mold 6. The stepper motors 8, 9 are configured to move the nozzle 5 up and down and the mold 6 away from the nozzle 5, respectively.

The Z-axis and X-axis stepper motors 8, 9 are each coupled to rails 10, 11, 12 in order to help facilitate the movement of the nozzle 5 and the mold 6. In this example, the rails 10, 11, 12 are substantially cross-shaped in their cross-sections but they may be of any suitable cross-section. The X-axis stepper motor 9 is coupled to the first and second rails 10, 11 in order to move the mold 6 from underneath the nozzle after the printing process has been completed and the Z-axis stepper motor is coupled to a third rail 12 to help facilitate the movement of the nozzle 5 away from the mold 6 after the completion of the printing process. The Z-axis and X-axis stepper motors 8, 9 may comprise memories and processors configured to actuate the motors 8, 9. In the example of FIG. 1, there are two first rails 10 and one second rail 11 to which the X-axis stepper motor 9 is coupled. This may be particularly advantageous for both the stability of the device 1 and the stability of the nozzle 5 and the mold 6 during the printing process. In some examples, the quantity of first and second rails 10, 11 may vary depending on the printing process the device 1 has been assigned.

The nozzle 5 further comprises an input portion configured to receive the ink from the pipe 4 and a channel 15 coupled to the input portion 14. The channel 15 is configured to guide the ink through the nozzle 5. In some examples, the diameter of the channel 15 is no larger than the diameter of the pipe 4. This may result in a steady ink flow to the nozzle 5. In some examples, there are multiple pipes 4 and multiple channels 15. This may allow for different inks and/or materials to be injected at different points of time in the printing process and/or at different heights in regard to the Z-axis of the nozzle 5.

In some examples, the X-axis stepper motor 9 is configured to control additional actuators and/or sensors and/or surface mounted devices (SMDs) and/or firmware to drive the mechanics and/or electronics of the device 1.

In the above, ink is described. However, any suitable material for 3D printing, such as metal or plastic may additionally or alternatively be used. Furthermore, stepper motors are described but any suitable method of moving the nozzle 5 and the mold 6 may be used.

Figure 2:
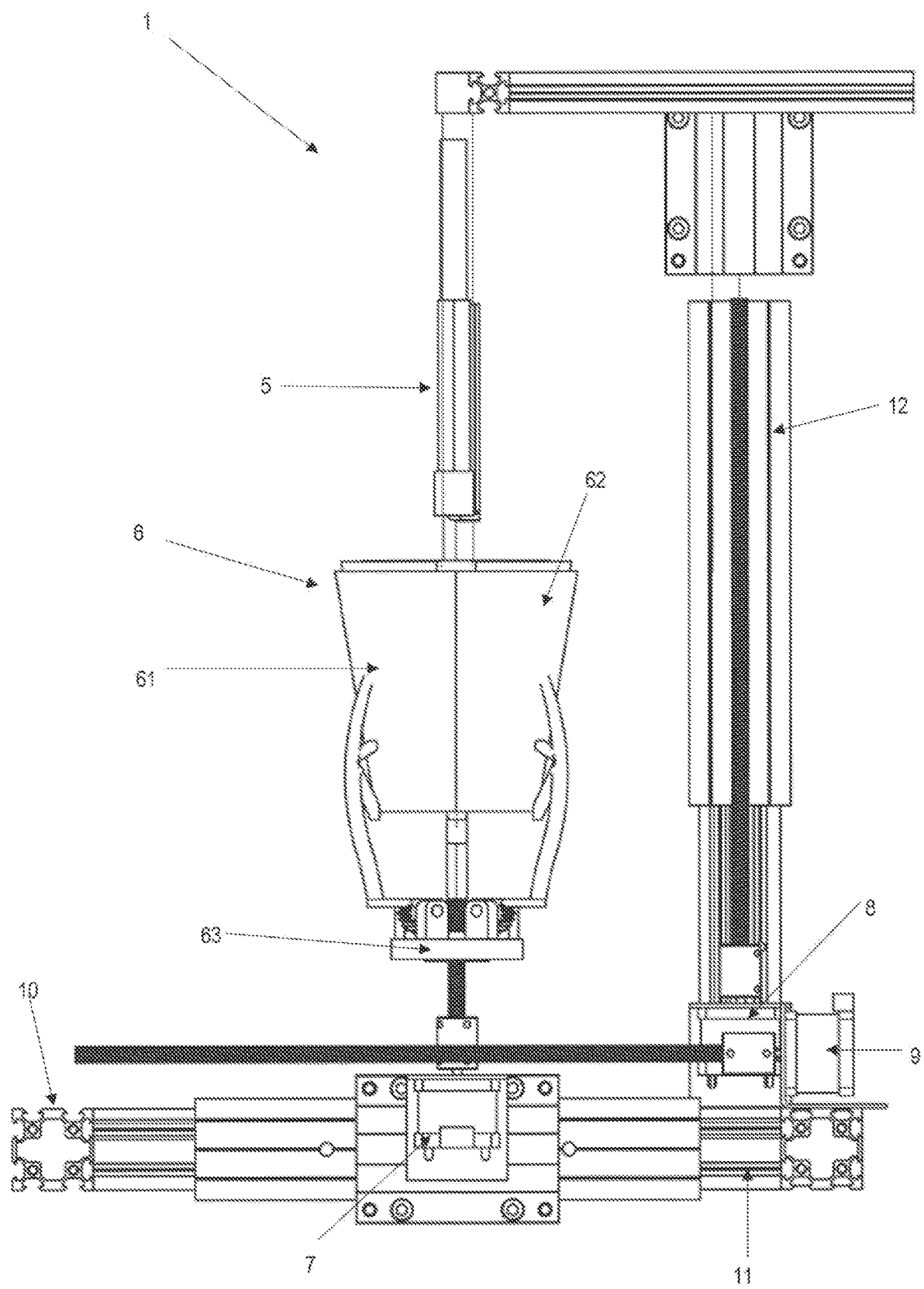
FIG. 2 shows a side view of a schematic illustration of a system for 3D ink printing according to some examples as described herein.
Figure 3:
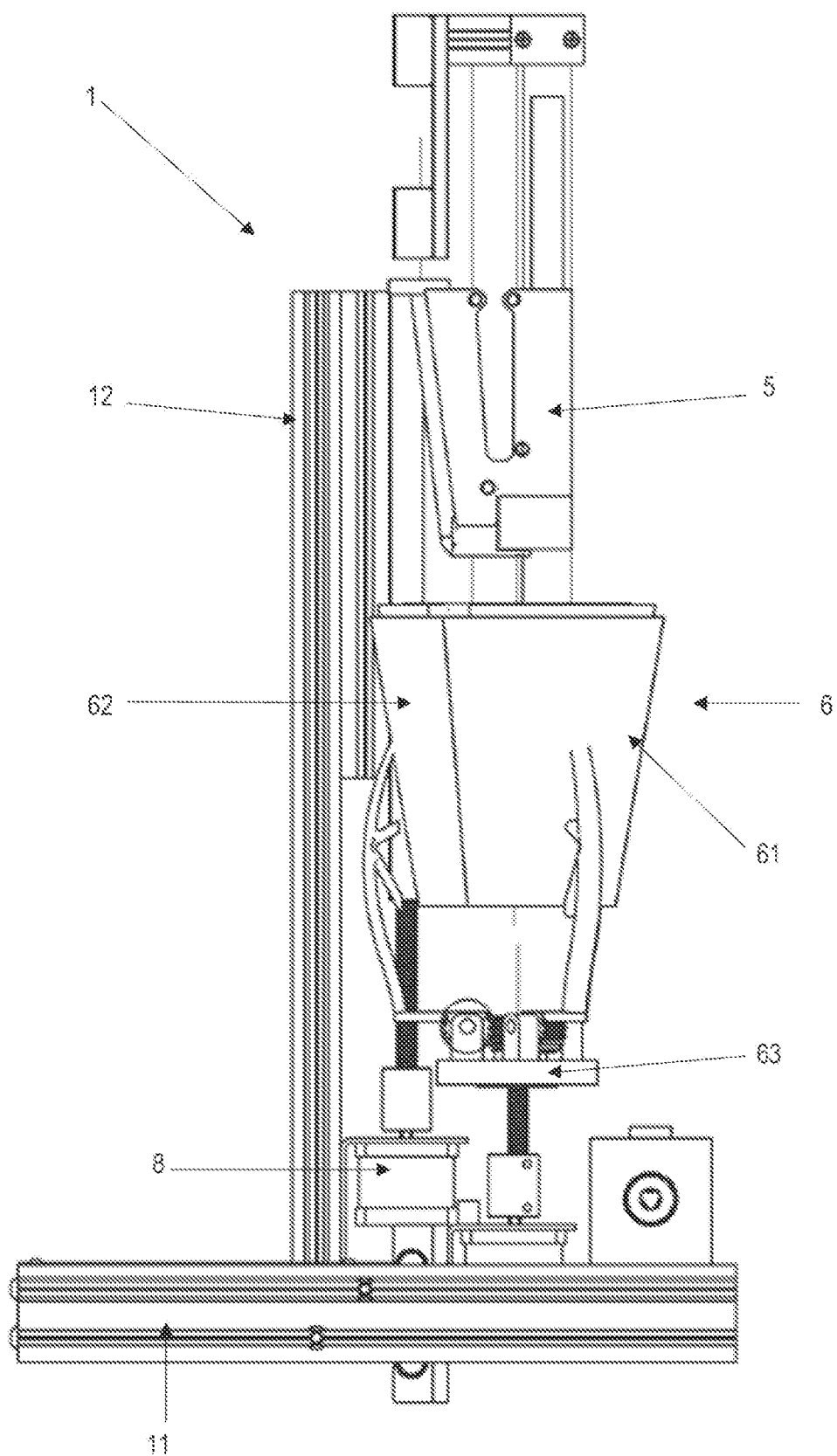
FIG. 3 shows a front view of a schematic illustration of a system for 3D ink printing according to some examples as described herein.

FIG. 2 shows a side view of a schematic illustration of a system for 3D ink printing according to some examples as described herein. FIG. 3 shows a front view of a schematic illustration of a system for 3D ink printing according to some examples as described herein.

FIGS. 2 and 3 show a side and frontal view of a schematic illustration of the device 1 respectively. As can be further seen in these figures, in this example, the mold 6 comprises multiple sections 61, 62. These sections 61, 62 are coupled to an anchoring plate 63 of the mold 6. The sections 61, 62 are coupled to the anchoring plate 63 via hinges that allow for the sections 61, 62 to open out and make the retrieving process of the printed object easier. In this example, the entirety of the sections 61, 62 open, but in some examples, only a section of the sections 61, 62 open, such as, for example, the top half of the sections 61, 62. The anchoring plate 63 may be in the form of a disk, as shown in FIGS. 2 and 3, or may alternatively be a cylinder, a cuboid, or any other suitable shape.

Figure 4B:
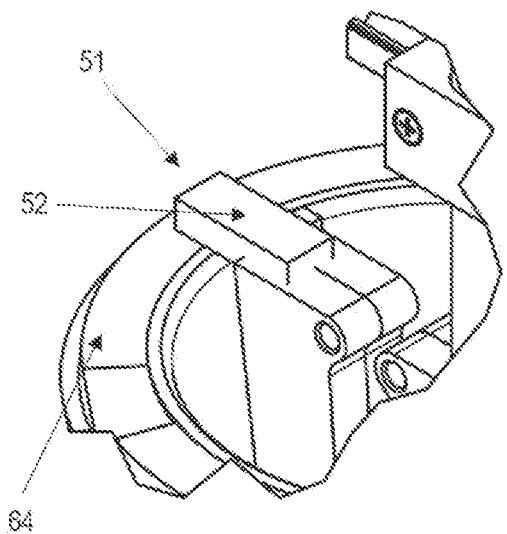
FIGS. 4a and b show perspective views of a schematic illustration of a system for 3D ink printing according to some examples as described herein.
Figure 4A:
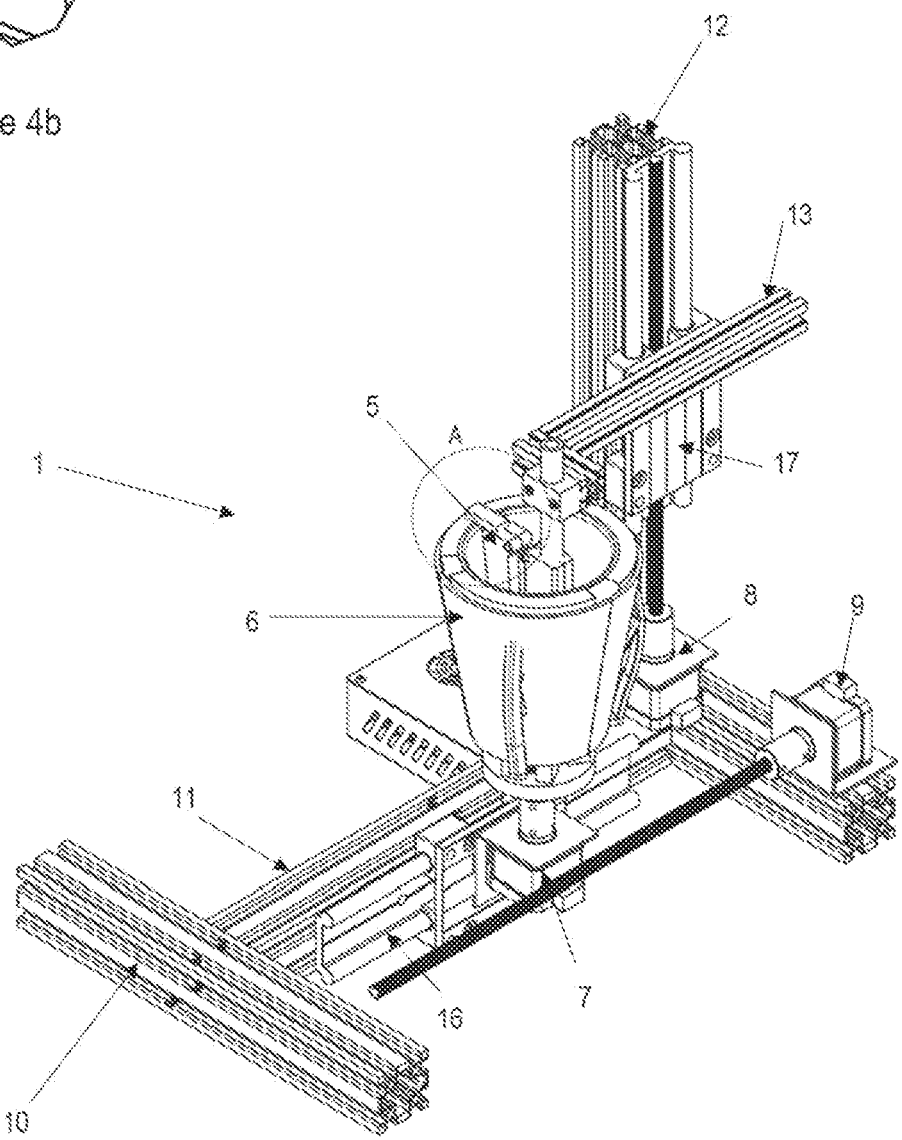

FIGS. 4a and b show perspective views of a schematic illustration of a system for 3D ink printing according to some examples as described herein.

In the example of FIG. 4a, an additional rail 13 is shown. This additional rail 13 is coupled to the nozzle 5 and to the third rail 12 and is configured to move the nozzle 5 in a direction perpendicular to that of the third rail 12. The movement of the nozzle 5 in this perpendicular direction may be actuated by a stepper motor similar to those described above. It can be further seen that the movement of the mold 6 and the nozzle 5 by the stepper motors 7, 8, 9 is aided by a series of sliders 16, 17. These sliders are coupled to the rails 11, 12 and allow for a substantially frictionless movement of the nozzle 5 and the mold 6.

The section highlighted by circle "A" in FIG. 4a can be seen in FIG. 4b. The end of the nozzle 5 furthest from the base of the mold comprises an overflow prevention portion 51. This overflow prevention portion 51 is configured to prevent ink from flowing out of the mold 6, thereby reducing the ink wastage and reducing manufacturing costs. The overflow prevention portion 51 comprises an elongated element 52 substantially perpendicular to the longitudinal axis of the nozzle 5. This further aids prevention of overflowing ink. Additionally, the elongated element 52 contacts a surface 64 of the mold 6 during the printing process. This further prevents the overflowing of ink. In this example, the elongated element is cuboidal but may alternatively be cylindrical, prismatic or a bespoke design. In this example, the elongated element 52 contacts a top surface 64 of the mold 6, but may additionally or alternatively contact any other suitable part of the mold 6 to prevent the overflowing of ink.

Figure 5:
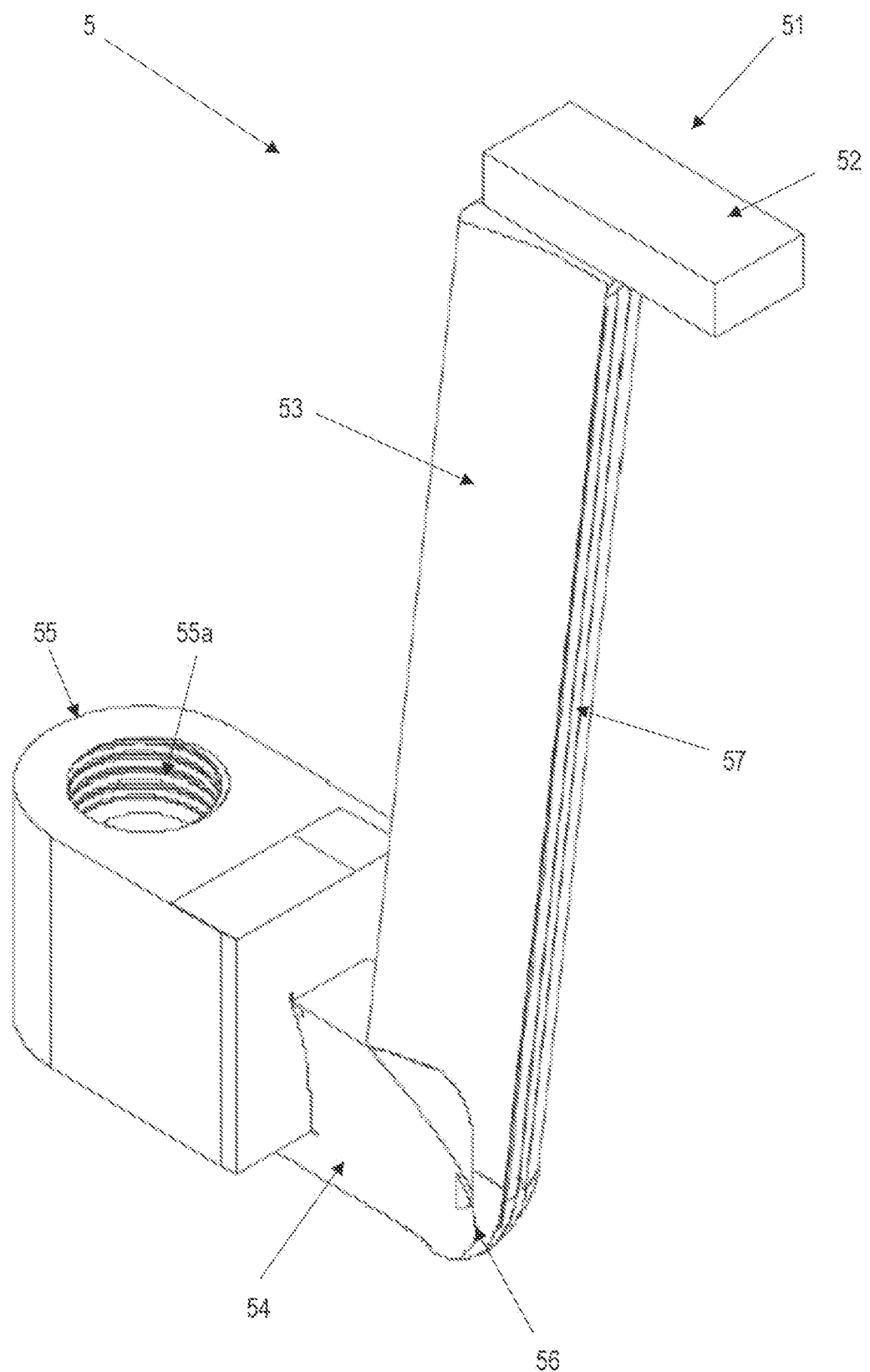
FIGS. 5 to 7 show perspective views of a schematic illustration of a nozzle for 3D ink printing according to some examples as described herein.
Figure 6:
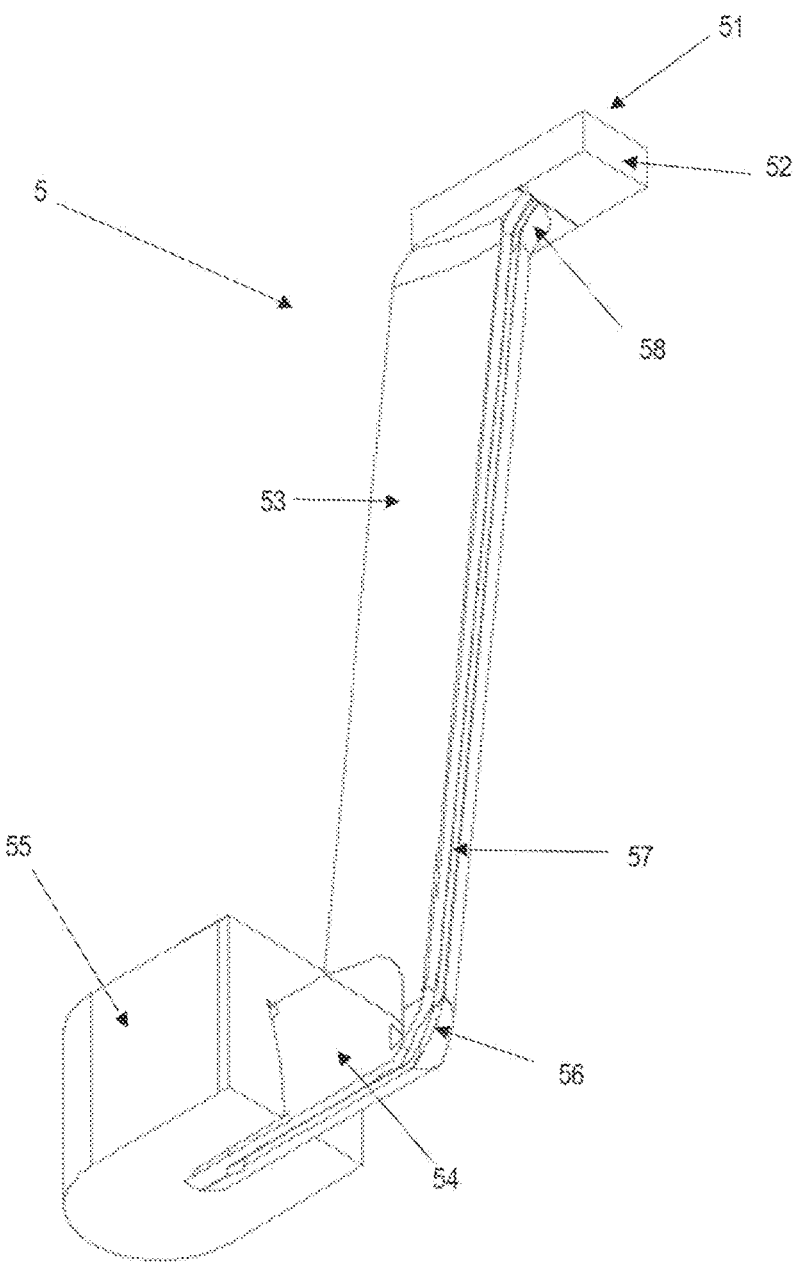
Figure 7:
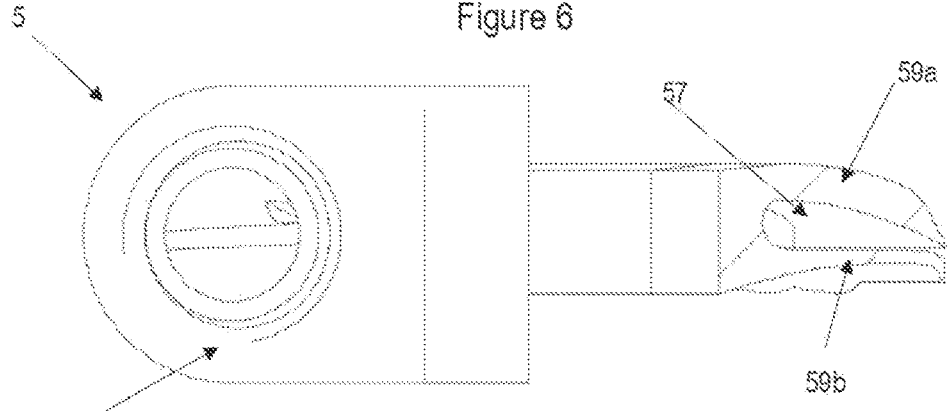

FIGS. 5 to 7 show perspective views of a schematic illustration of a nozzle for 3D ink printing according to some examples as described herein.

The nozzle 5 comprises an overflow prevention portion 51, as described above, a first leg 53, a second leg, 54, an anchoring portion 55, a hinge 56 and an output channel 57.

The first leg 53 comprises a preferably rigid material, such as plastic, to maintain rigidity of the nozzle 5 during the printing process. Coupled to a first end of the first leg 53 is the overflow prevention portion 51. Coupled to a second end of the first leg 53, opposite to the first end, is the second leg 54. The second leg 54 is, in some examples, shorter in length than the first leg 53. In some examples, the second leg 54 is the same length or longer than the first leg 53. The second leg 54 is constructed in substantially the same manner as the first leg 53. The legs in this example are substantially cuboidal, but they may be cylindrical, prismatic or of a bespoke design.

In this example, the second leg 54 is coupled to an anchoring portion 55. In this example, the anchoring portion comprises a thread 55a for a screw or a bolt but the anchoring portion 55 may comprise any suitable element, such as a pin and/or a hinge, for anchoring the nozzle 5 to an external device, such as the device 1 described above. The anchoring portion 55 may be of any suitable design such as the one shown in FIG. 5, a cylinder, a cuboid, a prism or a bespoke design.

Between the first 53 and second 54 legs is a hinge 56 for coupling the first and second legs 53, 54 to each other. During operation of the nozzle 5, the legs are preferably kept at a predetermined angle with respect to each other. In some examples, this angle is between approximately 90 degrees i.e. perpendicular to each other, and approximately 120 degrees. In some examples, the angle corresponds to the angle between the base and a side of the mold 6 to allow for an accurate printing of an object. The angle of the hinge 56 may be kept constant throughout the lifetime of the nozzle 5. That is to say, the angle may permanently be 90 degrees and for this angle to be changed, the nozzle 5 may need to be replaced. In some examples, the angle is changeable manually, i.e. by hand, according to the characteristics of the mold 6. In some examples, the nozzle 5 comprises a motor, a processor and a memory configured to alter the angle automatically based upon characteristics of the mold 6.

In FIG. 5, it can be seen that the first leg 53 comprises an elongated output channel 57. The elongated output channel 57 will be described in more detail below.

FIG. 6 shows a perspective bottom view of a schematic illustration of the nozzle 5. It can be seen that, in this example, the elongated output channel 57 continues along the underside of the second leg 54 and the anchoring portion 55. In this example, the elongated output channel 57 is continuous along the length of the first leg 53, the second leg 54 and the anchoring portion 55. This may allow for the bottom of the object to be printed simultaneously with the walls of the object. In some examples, the elongated output channel 57 is discontinuous. In some examples, one or more of the first leg 53, the second leg 54 and the anchoring portion 55 does not comprise the elongated output channel 57.

The nozzle 5 further comprises a rotatable element 58 configured to contact a face of the mold 6 to stabilize the nozzle 5 with respect to the mold 6 during the printing process. This rotatable element 58 may be a spring loaded wheel that stabilizes the upper edge of the nozzle and helps in maintaining a tight tolerance with regards to a homogeneous wall thickness.

FIG. 7 shows a top view of a schematic illustration of the nozzle 5. The elongated output channel 57 is formed by two lips 59a, 59b. The lips 59a, 59b are preferably elongated so that the lips 59a, 59b are along the entire length of the elongated output channel 57. The channel 15 configured to guide ink through the nozzle 5 guides the ink into the elongated output channel 57 formed by the lips 59a, 59b. In this example, the ink is injected into the nozzle 5 via pressure, generated by the RAM extruder 3.

The first lip 59a seals a gap between the nozzle 5 and the mold 6. This may allow for a reduction in ink wastage and for an improved end product. The second lip 59b is configured to be biased towards the first lip 59a and control a dimensional thickness of a portion of the output object via controlling the output pressure of the ink from the elongated output channel 57. In this example, the second lip 59b is configured to be moveable with respect to the first lip 59a. This movement may be via pressure of the output ink, as described above, and/or via a manual adjustment of the distance between the lips 59a, 59b and/or via an automatic adjustment of the distance between the lips 59a, 59b. In this example, the distance between the lips 59a, 59b controls a dimensional thickness of the output product. However, in some examples, the distance may additionally or alternatively determine an output pressure of the ink and/or an output velocity of the ink and/or a viscosity of the ink and/or any other suitable characteristic. The lips 59a, 59b preferably comprise a flexible material, but may comprise any suitable material.

In some examples, the elongated output channel 57 and the lips 59a, 59b may comprise a helix design (see FIG. 9) to further support material flow in the positive Z-axis direction, "flushing" the ink/supporting the ink flow in the positive Z-axis direction. The ink flow can be further controlled by controlling the distance between the lips 59a, 59b in a variable manner along the length of the elongated output channel 57. That is to say, the distance between the lips 59a, 59b may be, for example, 1 mm at one section of the elongated output channel and 0.5 mm at a second section of the elongated output channel 57; as will be appreciated, these are only examples of distances between the lips. This may allow for the controlling of certain design features such as, for example, embossed or engraved details in the mold 6 which may need differing amounts of ink to be output onto differing sections of the mold 6.

In this example, a further method of controlling the wall thickness of the completed product is by raising the nozzle 5 during the printing process via the Z-axis stepper motor 8. Furthermore, the nozzle 5 may output ink onto a portion of the mold 6 several times in order to produce multilayered, multi material objects. As the resulting object is built up, in this example, from the bottom of the mold 6, it is possible to stop the printing process or limit the extrusion at a certain Z-axis height by, for example, altering the distance between the lips 59a, 59b, which in turn may produce different vessel sizes without having to account for different mold sizes. In some examples, after completion of the printing process, the ink flow is stopped or even retracted. The ink flow may be stopped by indicating to the RAM extruder 3 that the printing process has been completed. The RAM extruder 3 may then stop exerting pressure on the ink cartridge 2 or may even apply a negative pressure on the ink cartage 3 in order to retract ink from the elongated output channel 57. This may result in a reduction in excess material when compared to known methods of printing.

The nozzle 5 is preferably made out of rigid materials, such as, for example, plastic, so as to improve resilience of the nozzle 5 during the printing process, but may alternatively comprise any suitable material that allows the nozzle 5 to function.

Figure 8A:
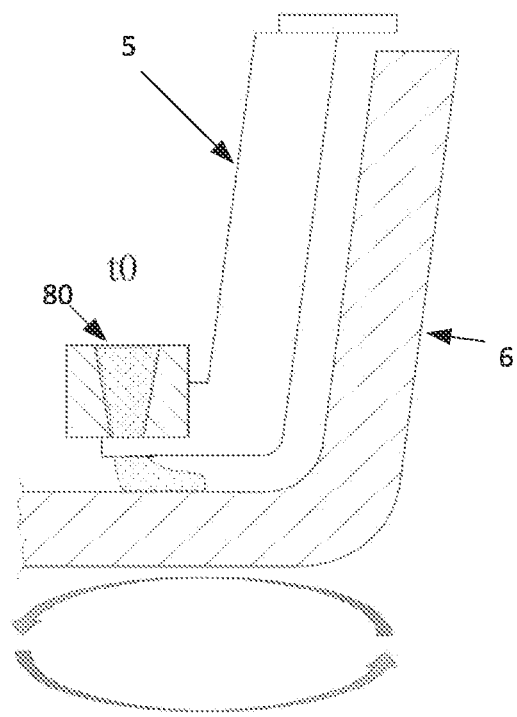
FIGS. 8a to c show perspective views of a schematic illustration of a method of 3D ink printing according to some examples as described herein.
Figure 8B:
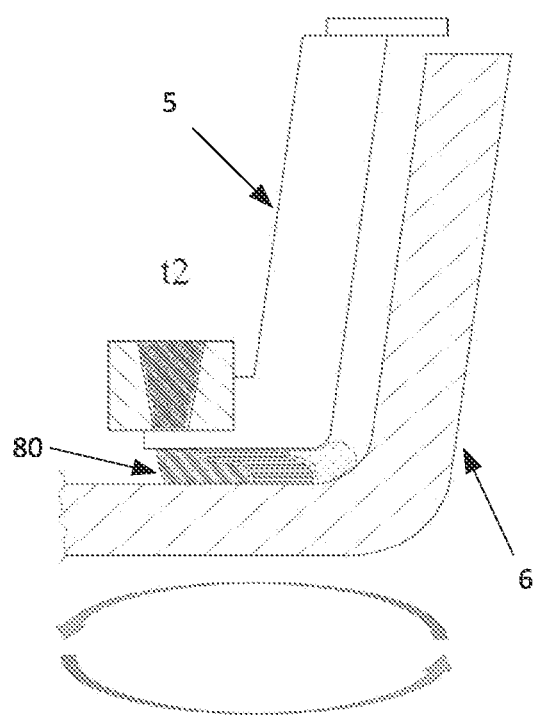
Figure 8C:
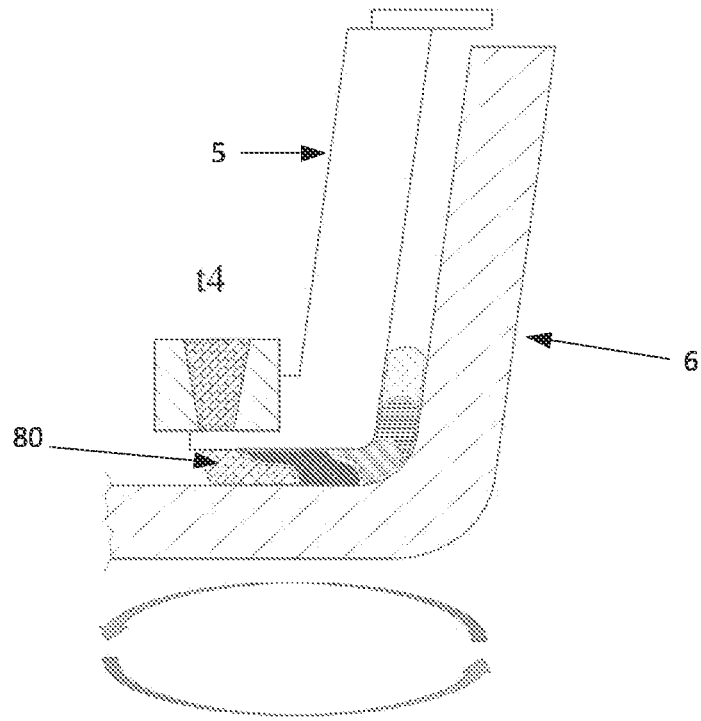

FIGS. 8a to c show perspective views of a schematic illustration of a method of 3D ink printing according to some examples as described herein. In these figures, a cutaway version of the nozzle and mold is shown with the elongated output channel 57 shown but the lips 59a, 59b not being shown for illustrative purposes.

As the mold 6 rotates, the RAM extruder 3, in some examples, inputs a predetermined volume of the ink 80 into the nozzle 5 (here the bottom part of the nozzle), wherein the predetermined volume is a volume necessary to print an object partly or fully. The ink 80 flows from the ink cartridge 2 through a pipe 4 and into the nozzle 5 (see e.g. FIG. 1). In some examples, the mold 6 is stationary and it is the nozzle 5 that rotates. In some examples, both the mold 6 and the nozzle 5 rotate. In some examples, the mold 6 rotates and the nozzle 5 is stationary. In some examples, the RAM extruder 3 inputs ink 80 into the nozzle at a predetermined rate. The nozzle starts being filled on a side of the mold 6 opposing the bottom side of the nozzle 5. That is to say, the side of the nozzle 5 that is, in this example, substantially parallel to, and opposite to, the bottom of the mold 6. In some examples, the side of the nozzle 5 may be substantially parallel to, and opposite to, any suitable surface. In this example, the bottom of the mold 6 comprises a plane substantially parallel to the ground, i.e., a horizontal plane. As soon as the channel 57, which is radially aligned to the second leg 54, gets filled, the nozzle 5 starts depositing ink 80 onto the mold 6 in a radial direction corresponding to the anchoring portion 55, i.e.

away from the center of the mold 6 and towards a sidewall of said mold 6 on the bottom surface of said mold 6. In some examples, the channel 57 does not need to be filled and the ink 80 is output onto the mold 6 when the channel 57 is only partially filled. Additionally, the ink 80 may be deposited towards/in the first leg 53. The nozzle 5 first deposits the ink onto the bottom of the mold 6 through the substantially mold-parallel orifice, i.e., the elongated output channel 57 radially aligned to the second leg 54 (see FIG. 8*a*). The ink 80 gets deposited in an area, and at a rate, corresponding to one or more of the rheology of the ink, the size of the elongated output channel 57 defined by elongated first and second lips 59*a*, 59*b* of the nozzle 5 and the rotation speed of the mold 6. In some examples, a channel is formed by the lips 59*a*, 59*b*. This may comprise the same elongated output channel 57 and/or the same elongated lips 59*a*, 59*b* as described above. Generally, the size of the output channel is small to help ensure complete, uninterrupted printing of the object. In some examples, the size of the output channel may be large in order to facilitate fast printing and increase the quantity of objects produced in a given time frame. A size of the output channel may be defined as a volume of the channel and/or a gap between the elongated first and second lips and/or a cross-section of the elongated output channel. Over a single rotation, the ink 80 is preferably deposited at the same radii distance. That is to say, the same amount of the object is printed on all/select surfaces of the mold 6 during the rotation. This may be due to the ink viscosity. Over the same rotation, the ink 80, in some examples, may be deposited towards the sidewalls of the mold 6 and/or in a radial direction towards the first leg 53. Once said rotation is complete and a new one begins, the already deposited ink 80 is still at, or close by to, the ink deposition/extrusion position. The rotation(s) of the mold 6 may be continuous or intermittent. The continued outputting of ink 80 exerts a force due to, for example, boundary layer pressure on the newly deposited ink 80, which leads to the newly deposited ink 80 during the new rotation being deposited in a growing radial direction away from the center of the mold 6 as the ink 80 continues to flow through the output channel along the second leg 54 and towards the first leg 53 (see FIG. 8*b*). The ink 80 continues to be deposited in such a manner until reaching the outer rim of the bottom of the mold 6, i.e., ink 80 has been deposited at all relevant sections of the second leg 54 and onto the bottom of the mold 6. At this point, due to the viscosity of the ink 80, the already deposited ink 80 exerts a force, due to, for example, boundary layer pressure, and consequently, the ink 80 flows through the output channel along the first leg 53 (see FIG. 8*c*). That is to say, the ink 80 flows upwards with respect to the bottom of the mold 6 along the first leg 53, thereby 3D_printing on the side of the mold 6. Resultantly, the object builds up overlapping layers until the ink 80 reaches the upper end of the first leg 53 of the mold 6.

The printed object first grows radially with respect to the bottom plane of the mold 6 along the second leg 54 and later, with respect to the sidewall of the mold 6, along the first leg 53. In these cases, this may ensure that the object is printed in line with the curvature of the mold 6.

Figure 9:
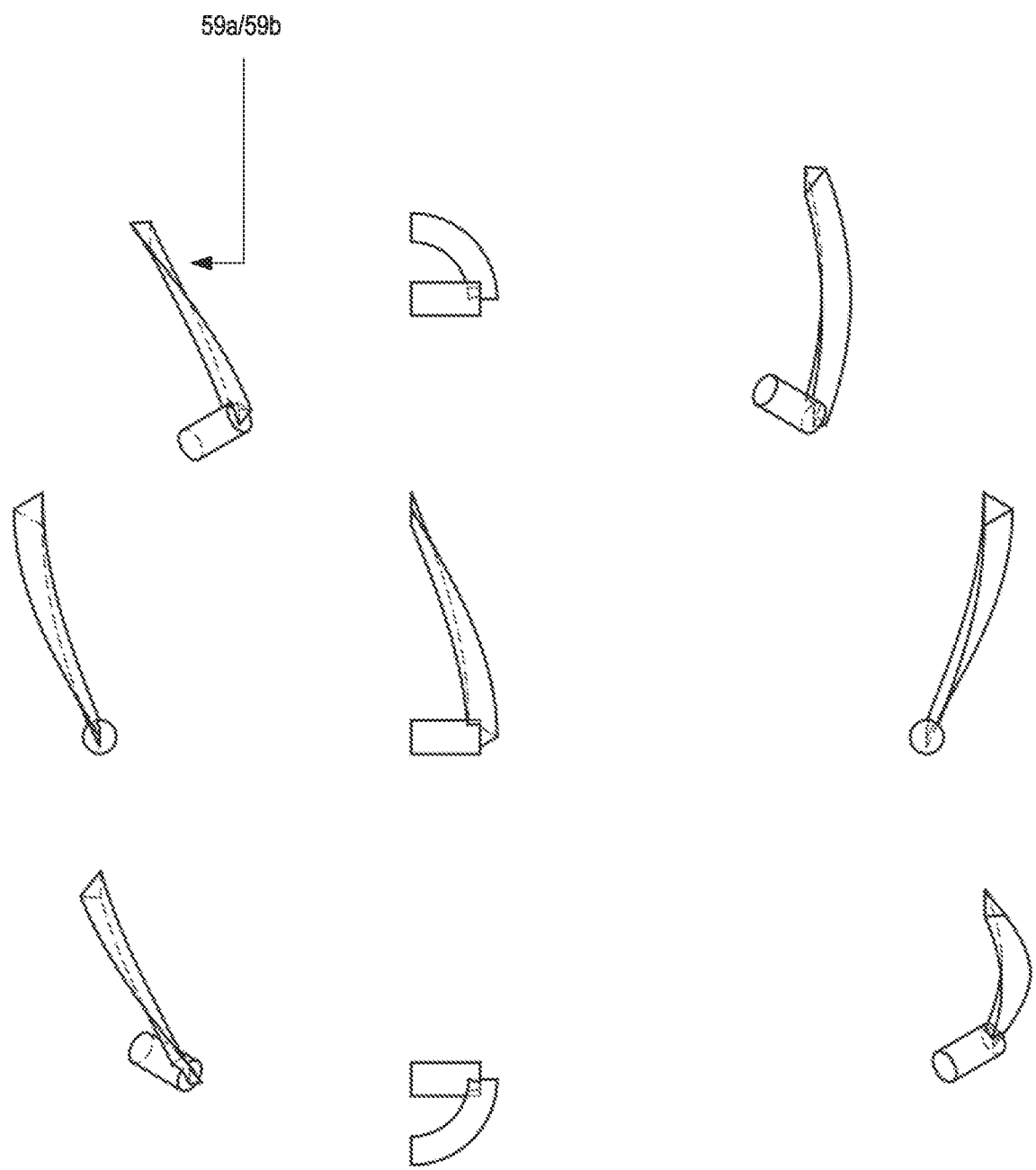
FIG. 9 shows perspective views of a helix design of a lip according to some examples as described herein.

The method can be described as follows:
providing a mold 6 and a nozzle 5, wherein the nozzle 5 comprises an elongated output channel 57 configured to output ink at different locations along a length of the elongated output channel 57 simultaneously, and wherein a shape of the elongated output channel 57 conforms to a shape of the mold 6; rotating, via a first motor, the mold 6; and outputting, via an output portion of the nozzle, the ink onto a first part of the mold 6, wherein the output portion of the nozzle 5 comprises at least a section of the elongated output channel 57. FIG. 9 shows perspective views of a helix design of a lip according to some examples as described herein.

The example of FIG. 9 shows a single-helix design of the first and/or second lips 59*a*, 59*b* that may result in a helix-shaped elongated output channel 57. The single-helix design may aid with the transfer of ink through the elongated output channel 57 and therefore the ink flow in the positive Z Axis direction of the elongated output channel 57. This may result in a reduction in the likelihood of blockages within the elongated output channel 57. This may also allow for the elongated output channel 57 and/or the nozzle 5 to act as a variation of an Auger screw. In some examples, the first and/or second lips 59*a*, 59*b* may comprise a double-helix design. In some examples, one of the first or second lips 59*a*, 59*b* may comprise a single-helix design while the other of the first or second lips 59*a*, 59*b* may comprise a double-helix design. In some examples, only one of the first or second lips 59*a*, 59*b* comprises a helix design.

Figure 10:
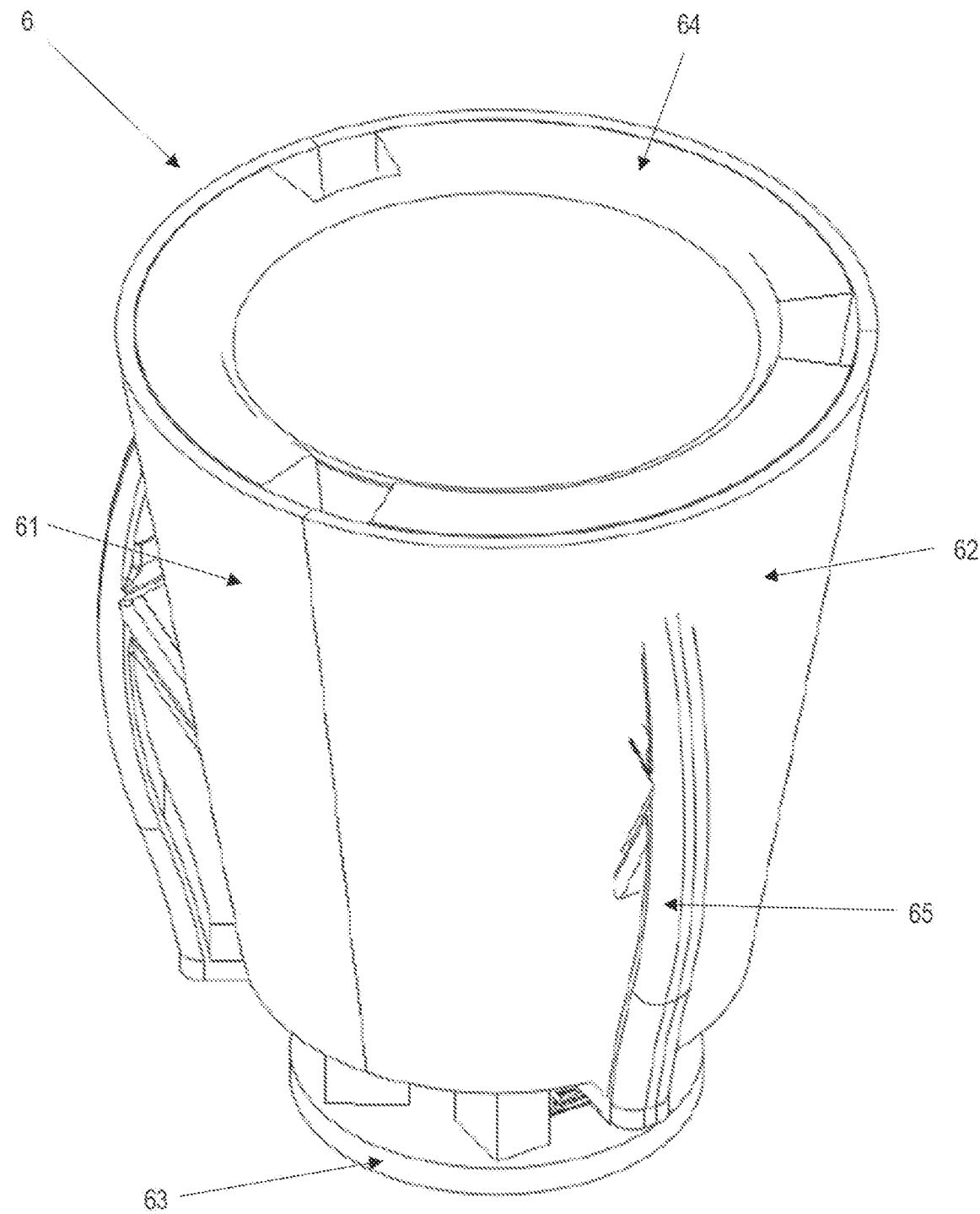
FIG. 10 shows a perspective view of a schematic illustration of a mold for 3D ink printing according to some examples as described herein.

FIG. 10 shows a perspective view of a schematic illustration of a mold for 3D ink printing according to some examples as described herein.

In this example, the mold 6 is a negative mold that reflects the outer surface of the finished object. Alternatively, the mold 6 may be a positive mold. In this example, the mold 6 is in the shape of a drinking vessel, such as a cup. Alternatively, the mold 6 is preferably of a symmetrical shape which results in a drinking vessel. Alternatively, the mold 6 may be of a bespoke design.

In this example, the mold 6 comprises a (micro-)porous material, such as, for example, an engineered porous polymer and/or partly fired ceramic and/or engineered porous ceramic and/or an engineered porous material and/or an engineered porous polymer. The porosity may help the drying of the ink once the ink is printed on a surface of the mold 6, thereby solidifying the ink. The use of a polymer may result in a more robust material which is suitable for longer term applications. In some examples, the mold 6 has a gradient density or gradient of microporosity in relation to the inner diameter vs. the outer diameter. That is to say, the porous material of at least a first portion of the mold 6 comprises a first porosity and the porous material of at least a second portion of the mold 6 comprises a second porosity, wherein the first porosity is different from the second porosity. This may be particularly useful in applications where differing inks and/or materials are output onto the mold 6 in different sections of the said mold 6. If differing inks and/or materials are output onto different sections of the mold 6, this may allow for a highly customizable product. For example, if the product to be printed is a cup, a central section may comprise a more heat resistant material than the other sections of the cup. This may allow the user to safely use the cup while still maintaining low manufacturing costs and a customizable design of the cup.

In this example, the mold 6 consists of a plurality of sections 61, 62 to aid the demolding process. Once the ink has been output onto the mold 6, it starts to dry. This can be supported by adding heat, as is described in more detail below. The drying process leads to a shrinkage of the output ink and thus, the object begins to separate from the mold 6. The sections 61, 62 are coupled to the anchoring plate 63 via a plurality of ribs 65, which in turn are coupled to elements on the anchoring plate 63 that allow for the sections 61, 62 of the mold to move away from the central axis of the mold 6. The sections 61, 62 may be biased, via the ribs 65 and the anchoring plate 63, towards the center of the mold 6. That is to say, with no external pressure applied to the ribs 65 and the sections 61, 62, the sections 61, 62 are in a "closed" position which allows for the printing process to begin. The sections 61, 62 may transition into an "open" position via pressure being applied on the ribs 65. This "open" position may allow for the printed object to be retrieved easily from the device 1. In this example, ribs 65 are shown but alternatively, the rib 65 may instead be any suitable element which couples the sections 61, 62 to the anchoring plate 63.

The upper edge 64 of the mold 6 may be sealed by a hydrophobic material such as, for example, silicon or wax to prevent any adhesion of ink to the mold 6 in areas where adhesion is not wanted. The mold 6 may also feature an increased outer surface area to further speed up the drying process by having, for example, a ribbed outer structure, similar to parts used for passive cooling of microchips or LEDs.

During the printing process, the mold 6 is kept spinning by the Y-axis stepper motor 7. In this example, the ink begins being output, by the elongated output channel 57, in the bottom center of the mold 6. The ink continuously flows upwards, through the elongated output channel 57, and builds up overlapping layers until the ink reaches the upper end of the mold. In some examples, the ink begins being output at a point of a wall of the mold 6 and the ink begins to flow towards the top and the bottom of the mold simultaneously. In some examples, the ink begins being output at a top of a wall of the mold 6 and begins flowing downwards towards the bottom of the mold 6. In this example, when the desired wall thickness is reached, the gap between the nozzle 5 and the mold 6 is closed or sealed by the printed and solidified ink which prevents the nozzle 5 from outputting further ink. This process may be stopped via the sensor of RAM extruder 3 described above.

In this example, the synergy of the nozzle 5 and the mold 6 allows for the printing of rotationally symmetric objects in a short amount of time. The combination of nozzle 5 and mold 6 further allows for the definition of the resulting wall thickness.

Figure 11B:
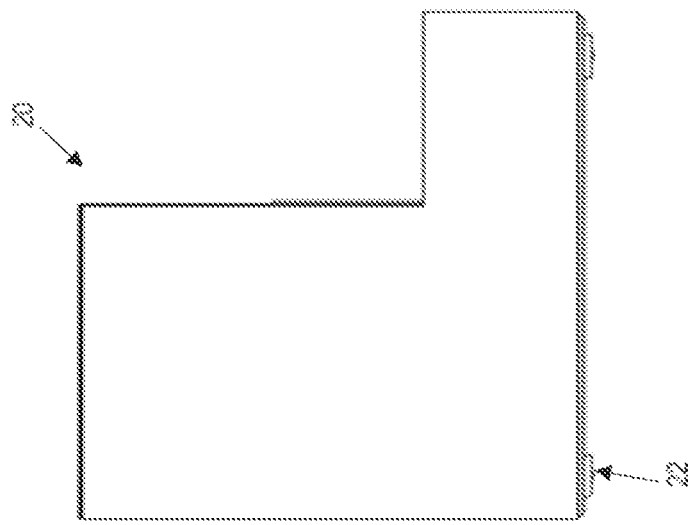
FIGS. 11a and b show views of a schematic illustration of a housing according to some examples as described herein.
Figure 11A:
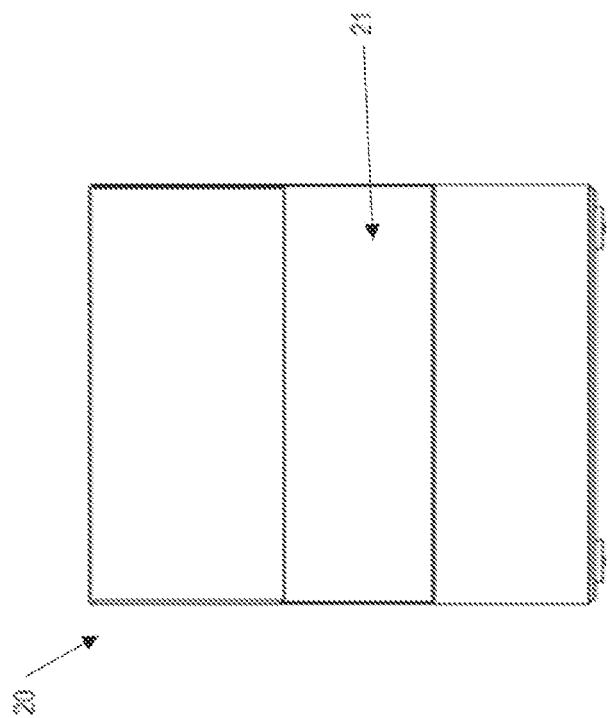

FIGS. 11a and 11b show views of a schematic illustration of a housing according to some examples as described herein.

FIGS. 11a and 11b show an example of a housing 20 configured to store the device 1 described above. The housing 20 in this example is L-shaped, but it may alternatively be of any suitable design. The housing comprises a moveable screen 21 configured to allow access into the printing area within the housing 20. The moveable screen 21 may preferably comprise a clear material, such as plastic, to allow for viewing into the printing area. The closed enclosure provided by the combination of the housing 20 and the screen 21 may help to maintain steady printing conditions and can reduce the chance of the ink drying out before and/or during the printing process. The "wet" i.e. high (e.g. above 80%, 85% or 90%) humidity atmosphere provided by the combination of the housing 20 and the screen 21 may further the prevention of the nozzle 5 drying out, which would lead to clogging, in between print jobs. In some examples, the housing further comprises feet 22 to absorb any vibrations or movements from the external environment, thereby leading to a more accurate end product.

Figure 12:
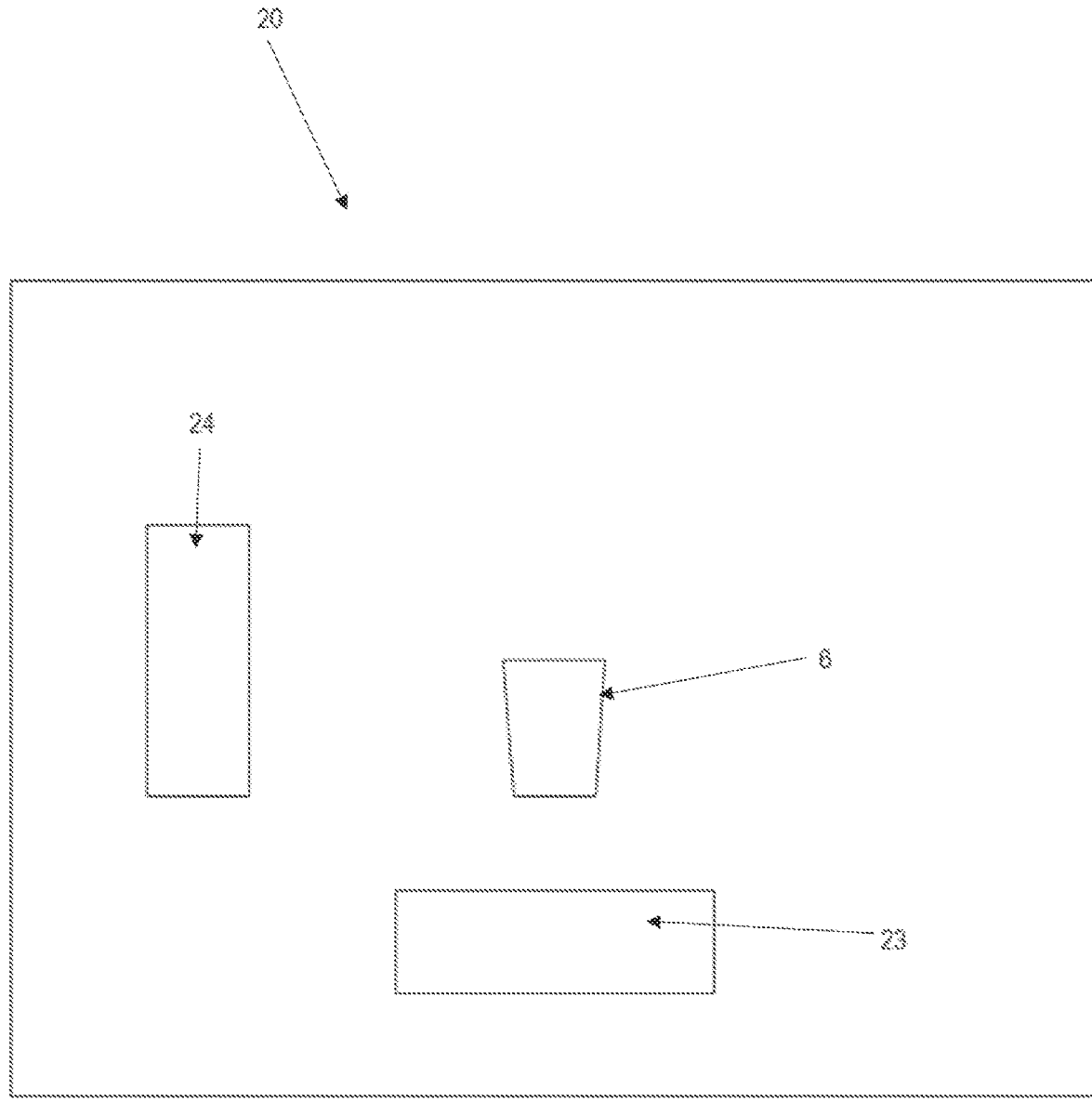
FIG. 12 shows a cutaway view of a schematic illustration of a housing according to some examples as described herein.

FIG. 12 shows a cutaway view of a schematic illustration of a housing according to some examples as described herein.

In this example, the housing 20 further comprises a heating unit 23 and a light source 24. For ease of illustration, only the mold 6 is shown but the skilled person understands that any other element or feature mentioned above can be placed within the housing 20.

Once the material is printed, it starts to dry. This drying process can be aided by applying heat via the heating unit 23. The drying process leads to a shrinkage of the material and thus the object separates from the mold 6. The heating unit 23 heats up the mold 6 prior to and/or after the printing process (and/or during the printing process). This helps release the printed object from the mold 6. The heating unit 23 may obtain heat via an electric heater, a water heater, or any other suitable heat source. The heating unit 23 may comprise a memory and a processor configured to switch on the heating unit 23 at certain points of the printing process.

The light source 24 may be a laser that is configured to partly sinter at a low energy level to reach a glazing effect on the surface of the printed object. This may in turn improve the resilience of the printed object. The light source 24 may comprise a memory and a processor configured to switch on the light source 24 at certain points of the printing process.

Additionally or alternatively to the heating unit 23 and the light source 24 mentioned above, the housing 20 may comprise one or more of a vacuum unit to aid the drying process, an induction module, a microwave module, and a UV light module to aid with the heating and/or sintering process.

No doubt many other effective alternatives will occur to the skilled person. It will be understood that the invention is not limited to the described embodiments and encompasses modifications apparent to those skilled in the art and lying within the scope of the claims appended hereto.

The invention claimed is:

1. A nozzle for a three-dimensional, 3D, ink printer, wherein the nozzle comprises:
   a channel configured to guide ink through the nozzle, and
   an output portion coupled to the channel, wherein the output portion is configured to output the ink,
   an anchoring portion configured to anchor the nozzle to a 3D ink printer, wherein the anchoring portion comprises at least a section of an elongated output channel,
   wherein the output portion comprises the elongated output channel configured to output the ink at different locations along a length of the elongated output channel simultaneously, and
   wherein the nozzle is formed from two leg portions connected to each other, wherein the two leg portions form an angle therebetween of between approximately 90 degrees and approximately 120 degrees,
   wherein the length of the elongated output channel is comprised in at least a first leg portion and in at least a second leg portion, and
   wherein the first leg portion and the second leg portion are connected with each other for the elongated output channel to be continuous along said length.

2. The nozzle as claimed in claim 1, wherein said elongated output channel being configured to output the ink at different locations along the length of the elongated output channel simultaneously is based on a said ink being guided through the output portion; and
   wherein the nozzle further comprises an input portion configured to receive the ink.

3. The nozzle as claimed in claim 1, further comprising an overflow prevention portion configured to prevent the ink from overflowing from the nozzle.

4. The nozzle as claimed in claim 1, further comprising a first lip and a second lip, wherein the elongated output channel is formed between the first and second lips.

5. The nozzle as claimed in claim 4, wherein the second lip is configured to be moveable with respect to the first lip to control a characteristic of the ink outputted based upon a distance of the second lip from the first lip.

6. The nozzle as claimed in claim 5, wherein a pressure exertable by the second lip onto the first lip, upon a contact between the first lip and the second lip while no ink is guided through the nozzle, is changeable based on the second lip being configured to be moveable with respect to the first lip, wherein the controllable characteristic comprises a thickness of an object printable via the nozzle from the ink, and wherein, during guiding a said ink through the nozzle, the thickness is controllable via the pressure.

7. The nozzle as claimed in claim 4, wherein at least one of the first lip and the second lip comprises a helix portion configured to aid outputting ink from the elongated output channel.

8. The nozzle as claimed in claim 1, further comprising an input portion configured to receive the ink, wherein the input portion comprises a plurality of input channels for guiding different ink materials through the nozzle.

9. A nozzle for a three-dimensional, 3D, ink printer, wherein the nozzle comprises:
a channel configured to guide ink through the nozzle, and
an output portion coupled to the channel, wherein the output portion is configured to output the ink,
wherein the output portion comprises an elongated output channel configured to output the ink at different locations along a length of the elongated output channel simultaneously,
wherein the nozzle further comprises:
a first lip and a second lip, wherein the elongated output channel is formed between the first and second lips, and
wherein at least one of the first lip and the second lip comprises a helix portion configured to aid outputting ink from the elongated output channel.

10. The nozzle as claimed in claim 2, wherein, if the input portion is configured to receive the ink, the channel configured to guide ink through the nozzle is configured to couple the input portion to the output portion for guiding the ink from the input portion to the output portion.

11. The nozzle as claimed in claim 3, wherein the overflow prevention portion comprises an elongated element arranged substantially perpendicular to a longitudinal axis of the elongated output channel.

12. The nozzle as claimed in claim 4, wherein the first and second lips comprise elongated first and second lips, respectively, and wherein the elongated output channel is defined by the elongated first and second lips.

13. The nozzle as claimed in claim 8, wherein the output portion comprises a plurality of elongated output channels, and wherein one of the plurality of elongated output channels is coupled to a corresponding, respective one of the plurality of input channels.

* * * * *